United States Patent
Koshima et al.

(12)

(10) Patent No.: US 6,906,191 B2
(45) Date of Patent: Jun. 14, 2005

(54) SUCCINIMIDE COMPOUNDS AND USE THEREOF

(75) Inventors: Hiroaki Koshima, Sodegaura (JP); Izumi Terada, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 36 days.

(21) Appl. No.: 10/129,968

(22) PCT Filed: Dec. 26, 2000

(86) PCT No.: PCT/JP00/09253

§ 371 (c)(1),
(2), (4) Date: May 22, 2002

(87) PCT Pub. No.: WO01/48055

PCT Pub. Date: Jul. 5, 2001

(65) Prior Publication Data

US 2003/0018198 A1 Jan. 23, 2003

(30) Foreign Application Priority Data

Dec. 27, 1999 (JP) .............................. 11-370661
Feb. 16, 2000 (JP) ........................ 2000-037521

(51) Int. Cl.$^7$ ............................................ C07D 241/04
(52) U.S. Cl. ....................................... 544/374
(58) Field of Search ......................... 544/374

(56) References Cited

U.S. PATENT DOCUMENTS

| 5,536,813 A | 7/1996 | Charpenel et al. |
| 5,565,290 A | 10/1996 | Itakura et al. |

FOREIGN PATENT DOCUMENTS

| DE | 893728 | 11/1982 |
| DE | 3433327 | 3/1985 |
| EP | 460309 | 12/1991 |
| EP | 0 657 475 | 6/1995 |
| EP | 0 825 249 | 2/1998 |
| JP | 63-254444 | 1/1988 |
| JP | 10-259394 | 9/1998 |

OTHER PUBLICATIONS

Harumichi Watanabe: "LTD Shlken ni yoru kohakusan imideno hyouka" Sekiyu Gakkaishi, vol. 14, No. 7, pp. 489–491 1971.

*Primary Examiner*—Kamal Saeed
(74) *Attorney, Agent, or Firm*—Oblon, Spivak, McClelland, Maier & Neustadt, P.C.

(57) ABSTRACT

Provided are a borosuccinimide compound obtained through reaction of (a) a succinic acid/anhydride substituted with an alkyl or alkenyl group having a number-average molecular weight of from 200 to 5,000, (b) a polyalkylene-polyamine of which at least 5 mol % has a terminal cyclic structure, and (c) a boron compound; and a succinimide compound obtained through reaction of (A) a succinic acid/anhydride substituted with an alkyl or alkenyl group having a molecular weight of from 200 to 5,000, with (D) a hydrocarbon-substituted polyalkylene-polyamine. These compounds are stable even at high temperatures and have good high-temperature detergency, and they are useful for ashless detergent dispersants having the ability to disperse fine particles. Also provided are a mixture of any of these compounds and a specific ester derivative; a lubricant additive and a fuel oil additive comprising the mixture as the essential ingredient; and a lubricant and a fuel oil composition containing the additive.

14 Claims, No Drawings

SUCCINIMIDE COMPOUNDS AND USE THEREOF

TECHNICAL FIELD

The present invention relates to novel succinimide compounds and their use, precisely to novel succinimide compounds useful for lubricants and detergent dispersants for fuel oil, to a lubricant additive and a fuel oil additive comprising the compound as the essential ingredient, and to a lubricant composition and a fuel oil composition.

BACKGROUND ART

Succinimides and hydroxybenzylamines are generally known for conventional ashless dispersants. Owing to their specific ability to disperse fine particles, the compounds have heretofore been widely used for lubricant additives for gasoline engine oil, diesel engine oil, and 2-cycle engine oil. In addition, since their synergistic effect with zinc dialkyldithiophosphates, metal detergents of the like is considered good, the compounds are one group of extremely important lubricant additives. However, it is often said that they are unstable at high temperatures and their detergency at high temperature is not satisfactory.

For example, JP-B 43631/1971 discloses reaction products obtained through reaction of a reaction intermediate of alkylphenol, formaldehyde and polyalkylene-polyamine with a polyalkenylsuccinic anhydride, and reaction products obtained through further reaction of that reaction product with a boron-containing compounds, saying that those reaction products are effective for oxidation-stable, ashless detergent dispersants and that they have improved oil-solubility. JP-A 8304/1976 discloses reaction products obtained through reaction of a reaction intermediate of polyalkenylsuccinic acid (anhydride) and polyalkylene-polyamine with an aromatic alcohol (e.g., alkylphenol, phenol, thiodiphenol) in the presence of aldehyde. However, these reaction products are still unsatisfactory in point of their stability at high temperatures.

JP-A 168492/1988 discloses reaction products like in JP-B 43631/1971, for which, however, used is glycolic acid as the reactant and not a boron-containing compound. As in the prior-art references, however, the reaction products are also unsatisfactory in point of their stability at high temperatures.

JP-A 345690/1992 discloses succinimide compounds prepared from a polyalkylene-polyamine mixture that comprises both a cyclic polyalkylene-polyamine and an acyclic polyalkylene-polyamine. They have no negative influence on fluoroelastomer seals, but are almost ineffective for detergency at high temperatures.

JP-A 168492/1988 discloses reaction products like in JP-B 43631/1971, for which, however, used is glycolic acid as the reactant and not a boron-containing compound. As in the prior-art references, however, the reaction products are also unsatisfactory in point of their stability at high temperatures.

Other various proposals have been made in, for example, JP-A 69758/1986, 276896/1990 and 353598/1992, but could not still solve the problems noted above.

Given that situation, most desired in the industrial field of the art are lubricant additives and lubricants having good high-temperature stability and good high-temperature detergency.

The invention is to solve the above-mentioned drawbacks of the prior-art techniques, and to provide novel compounds having good high-temperature stability and good high-temperature detergency and therefore useful for ashless detergent dispersants having the ability to disperse fine particles; additives for lubricant and fuel oil that comprise the novel compound as the essential ingredient; and lubricants and fuel oil compositions that contain the additive.

DISCLOSURE OF THE INVENTION

We, the present inventors have found that borosuccinimide compounds obtained from polyalkylene-polyamines having a specific chemical structure are unexpectedly effective for enhancing the ability of detergents as high temperatures, and have further found that a mixture of the borosuccinimide compound of the type and a specific, substituted hydroxy-aromatic carboxylate derivative is further effective for that purpose. In addition, we have also found that succinimide compounds having a specific chemical structure and succinimide compounds obtained through specific chemical reaction or physicochemical treatment of such specific compounds can effectively attain the object of the invention. On the basis of these findings, we have completed the present invention. Accordingly, the invention is summarized as follows:

[1] A borosuccinimide compound obtained through reaction of (a) a succinic acid or its anhydride substituted with an alkyl or alkenyl group having a number-average molecular weight of from 200 to 5,000, (b) a polyalkylene-polyamine of which at least 5 mol % has a terminal cyclic structure, and (c) a boron compound.

[2] The borosuccinimide compound of above [1], for which the terminal cyclic structure of the cyclic structure-terminated polyalkylene-polyamine is represented by the following structural formula (1):

(1)

wherein p and q each indicate an integer of from 2 to 4.

[3] The borosuccinimide compound of above [1] or [2], for which the cyclic structure-terminated polyalkylene-polyamine accounts for from 5 to 95 mol % of all the polyalkylene-polyamine.

[4] The borosuccinimide compound of any of above [1] to [3], for which the cyclic structure-terminated polyalkylene-polyamine accounts for from 10 to 90 mol % of all the polyalkylene-polyamine.

[5] The succinimide compound of any of above [1] to [4], for which the cyclic structure-terminated polyalkylene-polyamine is an aminoalkylpiperazine.

[6] The borosuccinimide compound of any of above [1] to [5], which has a boron content of from 0.05 to 5% by weight.

[7] A mixture of (A) the borosuccinimide compound of any of above [1] to [6], and (B) at least one compound selected from substituted hydroxy-aromatic carboxylate derivatives of the following general formula (2):

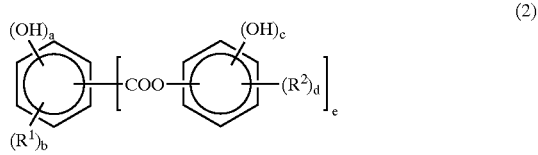

(2)

wherein $R^1$ and $R^2$ each represent an organic group having at least 6 carbon atoms, and they may be the same or different; a, b, c, d and e each are an integer satisfying $1 \leq a \leq 3$, $1 \leq b \leq 3$, $0 \leq c \leq 3$, $1 \leq d \leq 3$, $1 \leq e \leq 3$, $3 \leq (a+b+e) \leq 6$, and $1 \leq (c+d) \leq 5$; plural $R^1$'s and $R^2$'s, if any, may be the same or different,
and the following general formula (3):

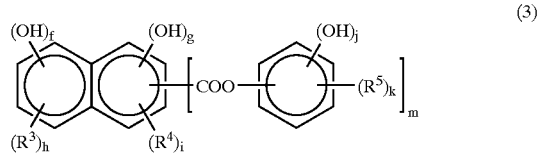
(3)

wherein $R^3$, $R^4$ and $R^5$ each represent an organic group having at least 6 carbon atoms, and they may be the same or different; f, g, h, i, j, k and m each are an integer satisfying $0 \leq f \leq 3$, $0 \leq g \leq 3$, $1 \leq (f+g) \leq 3$, $0 \leq h \leq 4$, $0 \leq i \leq 3$, $1 \leq (h+i) \leq 6$, $0 \leq j \leq 3$, $1 \leq k \leq 3$, $1 \leq m \leq 3$, $0 \leq (f+h) \leq 4$, $1 \leq (g+i+m) \leq 4$, and $1 \leq (j+k) \leq 5$; and plural $R^3$'s, $R^4$'s and $R^5$'s, if any, may be the same or different.

[8] A lubricant additive containing the borosuccinimide compound of any of above [1] to [6], or containing the borosuccinimide compound-containing mixture of claim 7.

[9] A fuel oil additive containing the borosuccinimide compound of any of above [1] to [6], or containing the borosuccinimide compound-containing mixture of claim 7.

[10] A lubricant composition containing the lubricant additive of above [8].

[11] A fuel oil composition containing the fuel oil additive of above [9].

[12] A succinimide compound of the following general formula (I):

(I)

wherein $R^1$ represents an alkyl or alkenyl group having a molecular weight of from 200 to 5,000; X represents a monovalent residue derived from a polyalkylene-polyamine optionally having a cyclic structure, by removing one terminal amino group from the polyalkylene-polyamine, and the other terminal is a group of the following general formula (II):

(II)

in which $R^2$ and $R^3$ each independently represent a hydrogen atom or a hydrocarbon group, but $R^2$ and $R^3$ are not hydrogen atoms at the same time.

[13] The succinimide compound of above [12], wherein at least one of $R^2$ and $R^3$ in formula (II) is a linear or branched alkyl group having from 1 to 16 carbon atoms, or a phenyl-substituted alkyl group with the phenyl group being optionally substituted with alkyl group(s) of the following general formula (III):

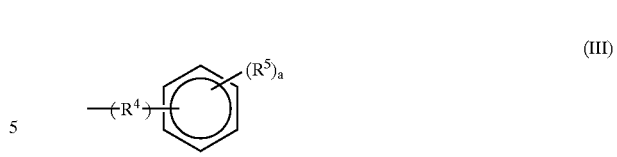
(III)

in which $R^4$ represents a linear or branched alkylene group having from 1 to 16 carbon atoms; $R^5$ represents a linear or branched alkyl group having from 1 to 16 carbon atoms; and a indicates an integer of from 0 to 3,
or a phenyl group optionally substituted with alkyl group(s) of the following general formula (IV):

(IV)

in which $R^6$ represents a linear or branched alkyl group having from 1 to 16 carbon atoms; and b indicates an integer of from 0 to 3.

[14] A succinimide compound obtained through (C) alkylation of a reaction product of (A) a succinic acid or its anhydride substituted with an alkyl or alkenyl group having a molecular weight of from 200 to 5,000, and (B) a polyalkylene-polyamine optionally having a cyclic structure.

[15] The succinimide compound of above [14], for which the alkylating agent for alkylation is a compound of the following general formula (V):

$$R^7—Y \quad (V)$$

wherein $R^7$ represents a hydrocarbon group; and Y represents a halogen atom or a sulfonic acid group.

[16] The succinimide compound of above [15], for which the hydrocarbon group $R^7$ in formula (V) is a linear or branched alkyl group having from 1 to 16 carbon atoms, or a phenyl-substituted alkyl group with the phenyl group being optionally substituted with alkyl group(s) of the following general formula (VI):

(VI)

in which $R^8$ represents a linear or branched alkylene group having from 1 to 16 carbon atoms; $R^9$ represents a linear or branched alkyl group having from 1 to 16 carbon atoms; and c indicates an integer of from 0 to 3,
or a phenyl group optionally substituted with alkyl group(s) of the following general formula (VII):

(VII)

in which $R^{10}$ represents a linear or branched alkyl group having from 1 to 16 carbon atoms; and d indicates an integer of from 0 to 3.

[17] The succinimide compound of above [14], for which the alkylating agent for alkylation is a compound of the following general formula (VIII):

$R^{11}$—CHO       (VIII)

in which $R^{11}$ represents a hydrocarbon group, and the alkylation comprises reaction with the alkylating agent followed by hydrogenation.

[18] The succinimide compound of above [16], for which the hydrocarbon group $R^{11}$ in formula (VIII) is a linear or branched alkyl group having from 1 to 16 carbon atoms, or a phenyl-substituted alkyl group with the phenyl group being optionally substituted with alkyl group(s) of the following general formula (IX):

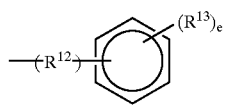     (IX)

in which $R^{12}$ represents a linear or branched alkylene group having from 1 to 16 carbon atoms; $R^{13}$ represents a linear or branched alkyl group having from 1 to 16 carbon atoms; and e indicates an integer of from 0 to 3, or a phenyl group optionally substituted with alkyl group(s) of the following general formula (X):

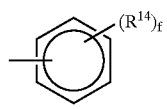     (X)

in which $R^{14}$ represents a linear or branched alkyl group having from 1 to 16 carbon atoms; and f indicates an integer of from 0 to 3.

[19] A succinimide compound obtained through reaction of (A) a succinic acid or its anhydride substituted with an alkyl or alkenyl group having a molecular weight of from 200 to 5,000, with (D) a hydrocarbon-substituted polyalkylene-polyamine of the following general formula (XI):

$H_2N$—X     (XI)

in which X represents a monovalent residue derived from a polyalkylene-polyamine optionally having a cyclic structure, by removing one terminal amino group from the polyalkylene-polyamine, and the other terminal is a group of the following general formula (XII):

     (XII)

in which $R^{15}$ and $R^{16}$ each independently represent a hydrogen atom or a hydrocarbon group, but $R^{15}$ and $R^{16}$ are not hydrogen atoms at the same time.

[20] The succinimide compound of above [18], wherein at least one of $R^{15}$ and $R^{16}$ in formula (XII) is a linear or branched alkyl group having from 1 to 16 carbon atoms, or a phenyl-substituted alkyl group with the phenyl group being optionally substituted with alkyl group(s) of the following general formula (XIII):

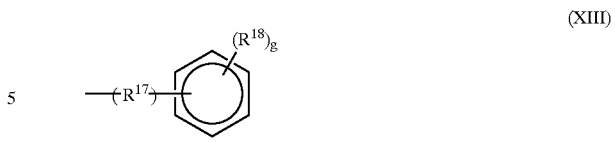     (XIII)

in which $R^{17}$ represents a linear or branched alkylene group having from 1 to 16 carbon atoms; $R^{18}$ represents a linear or branched alkyl group having from 1 to 16 carbon atoms; and g indicates an integer of from 0 to 3, or a phenyl group optionally substituted with alkyl group(s) of the following general formula (XIV):

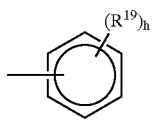     (XIV)

in which $R^{19}$ represents a linear or branched alkyl group having from 1 to 16 carbon atoms; and h indicates an integer of from 0 to 3.

[21] A succinimide compound containing at least 5% by weight of the succinimide compound of any of above [12] to [20].

[22] A succinimide compound obtained through <1> hydrogenation and/or <2> contact treatment with an adsorbent of the succinimide compound of any of above [12] to [21].

[23] A succinimide compound obtained through reaction of the succinimide compound of any of above [12] to [22] with a boron compound.

[24] A lubricant additive comprising, as the essential ingredient, the succinimide compound of any of above [12] to [23].

[25] A fuel oil additive comprising, as the essential ingredient, the succinimide compound of any of above [12] to [23].

[26] A lubricant composition containing the lubricant additive of above [24].

[27] A fuel oil composition containing the fuel oil additive of above [25].

BEST MODES OF CARRYING OUT THE INVENTION

Embodiments of the invention are described below.

The invention provides novel borosuccinimide compounds, and a mixture containing such a borosuccinimide compound and a specific, substituted hydroxy-aromatic carboxylate derivative. The invention also provides succinimide compounds having a specific chemical structure, and succinimide compounds obtained through specific chemical reaction or physicochemical treatment of such specific compounds. Those succinimide compounds, substituted hydroxy-aromatic carboxylate derivatives and their use in lubricant additives are described in detail in due order hereinunder.

1. Borosuccinimide Compounds:

As so mentioned hereinabove, the borosuccinimide compounds of the invention are obtained through reaction of (a) a succinic acid or its anhydride substituted with an alkyl or alkenyl group having a number-average molecular weight of from 200 to 5,000, (b) a polyalkylene-polyamine of which at least 5 mol % has a terminal cyclic structure, and (c) a boron compound.

The starting materials (a), (b) and (c), and methods of their production are described below.

Starting Material (a)

The starting material (a) to be used in the invention is a succinic acid or its anhydride substituted with an alkyl or alkenyl group.

The alkyl or alkenyl group has a number-average molecular weight (hereinafter referred to as a molecular weight or abbreviated as Mn) falling between 200 and 5,000, preferably between 500 and 2,000. If the molecular weight of the alkyl or alkenyl group is smaller than 200, the succinimide compounds could not well dissolve in lubricant base oil; but if larger than 5,000, the succinimide compounds will be too viscous and will be difficult to handle.

For the alkyl or alkenyl group having the defined molecular weight, generally used are polymers or copolymers of monoolefins or diolefins having from 2 to 16 carbon atoms, or their hydrides. Examples of the monoolefins are ethylene, propylene, butene, butadiene, decene, dodecene, and hexadecene. Of those monoolefins, especially preferred for use herein is butene as effective for enhancing high-temperature detergency and as easily available. Therefore preferred for use herein are a polybutenyl group derived from its polymer, and a hydropolybutenyl group, a type of an alkyl group derived from the polymer hydride.

The starting material (a), succinic acid or its anhydride substituted with such an alkyl or alkenyl group may be prepared by reacting a polybutene or the like of which the molecular weight falls within the defined range of the molecular weight of the alkyl or alkenyl group as above, with maleic anhydride or the like in a known manner.

Starting Material (b)

The starting material (b) for use in the invention is a polyalkylene-polyamine of which at least 5 mol % has a terminal cyclic structure. Specifically, all the polyalkylene-polyamine for the starting material (b) may have a terminal cyclic structure, or the starting material (b) may be a mixture of a polyalkylene-polyamine having a terminal cyclic structure and a polyalkylene-polyamine not having a terminal cyclic structure. However, if the ratio of the polyalkylene-polyamine having a terminal cyclic structure is smaller than 5 mol % of the starting material (b), the object of the invention to attain good high-temperature detergency could not be ensured. The ratio of at least 10 mol %, even at least 20 mol % is more preferred for the intended object of good high-temperature detergency. In the invention, however, the uppermost limit of the ration of the polyalkylene-polyamine having a terminal cyclic structure in the starting material (b) is preferably at most 95 mol %, more preferably at most 90 mol %. If the ratio is higher than 95 mol %, the borosuccinimide compounds to be produced will be too viscous and their productivity will lower. If so, in addition, the solubility of the products in lubricant base oil will be low. Therefore, the ratio of the polyalkylene-polyamine having a terminal cyclic structure preferably falls between 5 and 95 mol %, more preferably between 10 and 90 mol %.

The terminal cyclic structure of the cyclic structure-terminated polyalkylene-polyamine is preferably represented by formula (1) mentioned above. In formula (1), p and q each indicate an integer of from 2 to 4. Preferably, p and q are both 2, indicating a piperazinyl group for the cyclic structure. Typical examples of the polyalkylene-polyamine having such a terminal cyclic structure are piperazinyl structure-terminated aminoalkylpiperazines, such as aminoethylpiperazine, aminopropylpiperazine, aminobutylpiperazine, amino(diethylenediamino)piperazine, amino(dipropyldiamino)piperazine. Of those, especially preferred is aminoethylpiperazine as easily available.

On the other hand, the polyalkylene-polyamine not having a terminal cyclic structure includes acyclic polyalkylene-polyamines not having a cyclic structure, and polyalkylene-polyamines having a cyclic structure not at their terminals.

Typical examples of the acyclic polyalkylene-polyamine are polyethylene-polyamines such as ethylenediamine, diethylenetriamine, triethylenetetramine, tetraethylenepentamine, pentaethylenehexamine; and propylenediamine, dibutylenetriamine, and tributylenetriamine. Typical examples of the polyalkylene-polyamine having a cyclic structure not at its terminals are di(aminoalkyl)piperazines such as di(aminoethyl)piperazine.

Of those polyalkylene-polyamines optionally having a cyclic structure, especially preferred are mixtures with a polyethylene-polyamine such as triethylenetetramine, tetraethylenepentamine or pentaethylenehexamine, as effective for enhancing high-temperature detergency and as easily available.

Starting Material (c)

The starting material (c) for use in the invention is a boron compound. The boron compound includes, for example, boric acid, boric anhydride, borates, boron oxide and boron halides. Of those, especially preferred is boric acid.

Production of Borosuccinimide Compounds

The borosuccinimide compounds of the invention are reaction products to be obtained through reaction of the starting materials (a), (b) and (c).

The method of reacting them is not specifically defined, and may be any known one. For example, they may be reacted in the manner mentioned below to obtain the intended products.

The material (a) is first reacted with the material (b), and the resulting product is then reacted with the material (c) For the blend ratio of the materials (a) and (b) in their reaction, (a):(b) preferably falls between 0.1:1 and 10:1 by mol, more preferably between 0.5:1 and 2:1 by mol. The reaction temperature of the materials (a) and (b) preferably falls between 80° C. and 250° C., more preferably between 100° C. and 200° C. In their reaction, optionally used is a solvent, for example, an organic solvent such as hydrocarbon oil, for handling the materials with ease and for controlling the reaction.

Next, the reaction product of the materials (a) and (b) obtained in the manner as above is then reacted with the material (c). The blend ratio of the material (c), boron compound preferably falls between 1:0.05 and 1:10, more preferably between 1:0.5 and 1:5 by mol, to the polyalkylene-polyamine. The reaction temperature preferably falls between 50° C. and 250° C., more preferably between 100° C. and 200° C.

Like in the reaction of the materials (a) and (b), optionally used is a solvent, for example, an organic solvent such as hydrocarbon oil, also in the reaction with the material (c) for handling the reactants with ease and for controlling the reaction.

The reaction finally gives a product, borosuccinimide compound. The boron content of the reaction product preferably falls between 0.05 and 5% by weight, more preferably between 0.1 and 4% by weight, indicating the boron (atom) content of the reaction product, borosuccinimide compound. This is an important factor in the invention. Specifically, when the borosuccinimide compound of the invention contains at least a specific amount of boron in the molecule and when it satisfies the specific polyalkylene-polyamine composition as above, the invention attains the unexpected effect as above. In other words, if the boron content of the borosuccinimide compound is smaller than 0.05% by weight, the invention could not attain the object of high-temperature detergency. On the other hand, even if the boron content of the compound is larger than 5% by weight, the intended high-temperature detergency could not be enhanced any more, and such a high boron content of the compound will be of little use in practice.

As so mentioned hereinabove, the borosuccinimide compound of the invention is obtained by reacting the materials (a) and (b) followed by further reacting the resulting product with the material (c), but the order of reacting them may be changed. For example, the material (a) is first reacted with the material (c), and the reaction product is then reacted with the material (b). Also in this case, the intended borosuccinimide compound is well obtained.

2. Substituted Hydroxy-Aromatic Carboxylate Ester Derivatives:

In the second aspect of the invention, the component (A), borosuccinimide compound is used along with a component (B), a substituted hydroxy-aromatic carboxylate derivative.

The component (B) is at least one compound selected from substituted hydroxy-aromatic carboxylate derivatives of formulae (2) and (3) mentioned above.

In formulae (2) and (3), $R^1$, $R^2$, $R^3$, $R^4$ and $R^5$ each represent an organic group having at least 6 carbon atoms. The organic group having at least 6 carbon atoms is preferably a hydrocarbon group having from 6 to 100, more preferably from 8 to 20 carbon atoms. The hydrocarbon group includes, for example, an alkyl group, an alkenyl group, a cycloalkyl group, a cycloalkenyl group, and an aralkyl group, which may have non-hydrocarbon substituent(s) and may have hetero atom(s) in the chain or cyclic structure. Concretely, it includes hydrocarbon groups such as hexyl, octyl, nonyl, decyl, dodecyl, hexadecyl and triacontyl groups; and groups derived from olefin polymers such as polyethylene, polypropylene and polybutene. In case where substituted hydroxy-aromatic carboxylate derivatives of low viscosity are desired, it is preferable that $R^1$, $R^2$, $R^3$, $R^4$ and $R^5$ therein are substantially linear hydrocarbon groups. $R^1$ and $R^2$ may be the same or different; and $R^3$, $R^4$ and $R^5$ may also be the same or different.

In formula (2), a, b, c, d and e each are an integer satisfying $1 \leq a \leq 3$, $1 \leq b \leq 3$, $0 \leq c \leq 3$, $1 \leq d \leq 3$, $1 \leq e \leq 3$, $3 \leq (a+b+e) \leq 6$, and $1 \leq (c+d) \leq 5$. When b is 2 or 3, plural $R^1$'s may be the same or different. When d is 2 or 3, plural $R^2$'s may be the same or different.

In formula (3), f, g, h, i, j, k and m each are an integer satisfying $0 \leq f \leq 3$, $0 \leq g \leq 3$, $1 \leq (f+g) \leq 3$, $0 \leq h \leq 4$, $0 \leq i \leq 3$, $1 \leq (h+i) \leq 6$, $0 \leq j \leq 3$, $1 \leq k \leq 3$, $1 \leq m \leq 3$, $0 \leq (f+h) \leq 4$, $1 \leq (g+i+m) \leq 4$, and $1 \leq (j+k) \leq 5$. When h is 2, 3 or 4, plural $R^3$'s may be the same or different; when i is 2 or 3, plural $R^4$'s may be the same or different; and when k is 2 or 3, plural $R^5$'s may be the same or different.

Examples of the substituted hydroxy-aromatic carboxylate derivatives of formula (2) are hexylphenyl (hexylhydroxybenzoate), dodecylphenyl (hexylhydroxybenzoate), octylphenyl (octylhydroxybenzoate), nonylphenyl (nonylhydroxybenzoate), hexadecylphenyl (nonylhydroxybenzoate), nonylphenyl (dodecylhydroxybenzoate), dodecylphenyl (dodecylhydroxybenzoate), hexadecylphenyl (dodecylhydroxybenzoate), hexylphenyl (hexadecylhydroxybenzoate), dodecylphenyl (hexadecylhydroxybenzoate), hexadecylphenyl (hexadecylhydroxybenzoate), eicosylphenyl (eicosylhydroxybenzoate), mixed C11–15 alkylphenyl (mixed C11–15 alkylhydroxybenzoates), dodecylphenyl (long-chain alkylhydroxybenzoates, in which the long-chain alkyl is, for example, derived from polydecenes having at least 30 carbon atoms or from polybutenes having a number-average molecular weight of at least 400), long-chain alkylphenyl (in which the long-chain alkyl is, for example, derived from polydecenes having at least 30 carbon atoms or from polybutenes having a number-average molecular weight of at least 400) (long-chain alkylhydroxybenzoates, in which the long-chain alkyl is, for example, derived from polydecenes having at least 30 carbon atoms or from polybutenes having a number-average molecular weight of at least 400), hexylhydroxyphenyl (hexylhydroxybenzoate), octylhydroxyphenyl (octylhydroxybenzoate), nonylhydroxyphenyl (dodecylhydroxybenzoate), dodecylhydroxyphenyl (dodecylhydroxybenzoate), dodecylhydroxyphenyl (hexadecylhydroxybenzoate), hexadecylhydroxyphenyl (hexadecylhydroxybenzoate), eicosylhydroxyphenyl (eicosylhydroxybenzoate), mixed C11–15 alkylhydroxyphenyl (mixed C11–15 alkylhydroxybenzoates), dodecylhydroxyphenyl (long-chain alkylhydroxybenzoates, in which the long-chain alkyl is, for example, derived from polydecenes having at least 30 carbon atoms or from polybutenes having a number-average molecular weight of at least 400), long-chain alkylhydroxyphenyl (in which the long-chain alkyl is, for example, derived from polydecenes having at least 30 carbon atoms or from polybutenes having a number-average molecular weight of at least 400) (long-chain alkylhydroxybenzoates, in which the long-chain alkyl is, for example, derived from polydecenes having at least 30 carbon atoms or from polybutenes having a number-average molecular weight of at least 400), hexylphenyl (hexyldidroxybenzoate), nonylphenyl (nonyldihydroxybenzoate), dodecylphenyl (nonyldihydroxybenzoate), nonylphenyl (dodecyldihydroxybenzoate), dodecylphenyl (dodecyldihydroxybenzoate), hexadecylphenyl (hexadecyldihydroxybenzoate), hexadecylphenyl (eicosyldihydroxybenzoate), eicosylphenyl (eicosyldihydroxybenzoate), mixed C11–15 alkylphenyl (mixed C11–15 alkyldihydroxybenzoates), dodecylphenyl (long-chain alkyldihydroxybenzoates, in which the long-chain alkyl is, for example, derived from polydecenes having at least 30 carbon atoms or from polybutenes having a number-average molecular weight of at least 400), long-chain alkylphenyl (in which the long-chain alkyl is, for example, derived from polydecenes having at least 30 carbon atoms or from polybutenes having a number-average molecular weight of at least 400) (long-chain alkyldihydroxybenzoates, in which the long-chain alkyl is, for example, derived from polydecenes having at least 30 carbon atoms or from polybutenes having a number-average molecular weight of at least 400), hexyldihydroxyphenyl (hexyldihydroxybenzoate), nonylhydroxyphenyl (nonyldihydroxybenzoate), dodecylhydroxyphenyl (nonyldihydroxybenzoate), nonylhydroxyphenyl (dodecyldihydroxybenzoate), dodecylhydroxyphenyl (dodecyldihydroxybenzoate), hexadecylhydroxyphenyl (hexadecyldihydroxybenzoate), hexadecylhydroxyphenyl (eicosyldihydroxybenzoate), eicosylhydroxyphenyl (eicosyldihydroxybenzoate), mixed C11–15 alkylhydroxyphenyl (mixed C11–15 alkyldihydroxybenzoates), dodecylhydroxyphenyl (long-chain alkyldihydroxybenzoates, in which the long-chain alkyl is, for example, derived from polydecenes having at least 30 carbon atoms or from polybutenes having a number-average molecular weight of at least 400), long-chain alkylhydroxyphenyl (in which the long-chain alkyl is, for example, derived from polydecenes having at least 30 carbon atoms or from polybutenes having a number-average molecular weight of at least 400) (long-chain alkyldihydroxybenzoates, in which the long-chain alkyl is, for example, derived from polydecenes having at least 30 carbon atoms or from polybutenes having a number-average molecular weight of at least 400).

Examples of the substituted hydroxy-aromatic carboxylate derivatives of formula (3) are hexylphenyl (hexylhydroxynaphthoate), hexadecylphenyl (hexylhydroxynaphthoate), nonylphenyl (nonylhydroxynaphthoate), dodecylphenyl (dodecylhydroxynaphthoate), hexadecylphenyl (hexadecylhydroxynaphthoate), eicosylphenyl (dodecylhydroxynaphthoate), eicosylphenyl (eicosylhydroxynaphthoate), mixed C11–15 alkylphenyl (mixed C11–15 alkylhydroxynaphthoates), dodecylphenyl (long-chain alkylhydroxynaphthoates, in which the long-chain alkyl is, for example, derived from polydecenes having at least 30 carbon atoms or from polybutenes having a number-average molecular weight of at least 400), long-chain alkylphenyl (in which the long-chain alkyl is, for example, derived from polydecenes having at least 30 carbon atoms or from polybutenes having a number-average molecular weight of at least 400) (long-chain alkylhydroxynaphthoates, in which the long-chain alkyl is, for example, derived from polydecenes having at least 30 carbon atoms or from polybutenes having a number-average molecular weight of at least 400), dodecylhydroxyphenyl (hexylhydroxynaphthoate), dodecylhydroxyphenyl (octylhydroxynaphthoate), dodecylhydroxyphenyl (dodecylhydroxynaphthoate), hexadecylhydroxyphenyl (dodecylhydroxynaphthoate), hexadecylhydroxyphenyl (hexadecylhydroxynaphthoate), eicosylhydroxyphenyl (hexadecylhydroxynaphthoate), mixed C11–15 alkylhydroxyphenyl (mixed C11–15 alkylhydroxynaphthoates), dodecylhydroxyphenyl (long-chain alkylhydroxynaphthoates, in which the long-chain alkyl is, for example, derived from polydecenes having at least 30 carbon atoms or from polybutenes having a number-average molecular weight of at least 400), long-chain alkylhydroxyphenyl (in which the long-chain alkyl is, for example, derived from polydecenes having at least 30 carbon atoms or from polybutenes having a number-average molecular weight of at least 400), hexylphenyl (hexyldihydroxynaphthoate), hexadecylphenyl (hexyldihydroxynaphthoate), nonylphenyl (nonyldihydroxynaphthoate), dodecylphenyl (dodecyidihydroxynaphthoate), eicosylphenyl (dodecyldihydroxynaphthoate), hexadecylphenyl (hexadecyldihydroxynaphthoate), eicosylphenyl (eicosyldihydroxynaphthoate), mixed C11–15 alkylphenyl (mixed C11–15 alkyldihydroxynaphthoates), dodecylphenyl (long-chain alkyldihydroxynaphthoates, in which the long-chain alkyl is, for example, derived from polydecenes having at least 30 carbon atoms or from polybutenes having a number-average molecular weight of at least 400), dodecylhydroxyphenyl (hexyldihydroxynaphthoate), dodecylhydroxyphenyl (octyldihydroxynaphthoate), dodecylhydroxyphenyl (dodecyldihydroxynaphthoate), hexadecylhydroxyphenyl (dodecyldihydroxynaphthoate), hexadecylhydroxyphenyl (hexadecyldihydroxynaphthoate), eicosylhydroxyphenyl (hexadecyldihydroxynaphthoate), mixed C11–15 alkylhydroxyphenyl (mixed C11–15 alkyldihydroxynaphthoates), dodecylhydroxyphenyl (long-chain alkyldihydroxynaphthoates, in which the long-chain alkyl is, for example, derived from polydecenes having at least 30 carbon atoms or from polybutenes having a number-average molecular weight of at least 400) long-chain alkylhydroxyphenyl (in which the long-chain alkyl is, for example, derived from polydecenes having at least 30 carbon atoms or from polybutenes having a number-average molecular weight of at least 400) (long-chain alkyldihydroxynaphthoates, in which the long-chain alkyl is, for example, derived from polydecenes having at least 30 carbon atoms or from polybutenes having a number-average molecular weight of at least 400).

Of the substituted hydroxy-aromatic carboxylate derivatives, preferred are those of the following general formula (4):

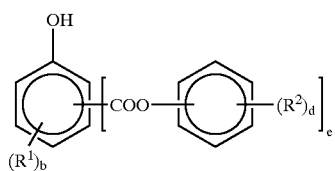

(4)

wherein $R^1$, $R^2$, b, d and e have the same meanings as above; and the sum of b and e falls between 2 and 5, and those of the following general formula (4'):

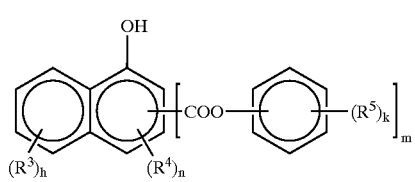

(4')

wherein $R^3$, $R^4$, $R^5$, h, k and m have the same meanings as above; n indicates 0, 1 or 2; the sum of h and n falls between 1 and 6; and the sum of m and n falls between 1 and 3.

The component (B) in the invention may be one or more of the substituted hydroxy-aromatic carboxylate derivatives of formula (2); or may be one or more of those of formula (3); or may be a combination of one or more of those of formula (2) and one or more of those of formula (3).

In the borosuccinimide compound-containing mixture of the invention, the blend ratio of the component (A), borosuccinimide compound to the component (B), at least one compound selected from substituted hydroxy-aromatic carboxylate derivatives of formulae (2) and (3) preferably falls between 1:99 and 99:1, more preferably between 10:90 and 90:10 by weight.

3. Use:

The borosuccinimide compounds of the invention are effectively used for detergent dispersants. The detergent dispersant comprising the compound may be added to hydrocarbon oil or synthetic oil in a ratio falling between 0.1 and 80% by weight to prepare a lubricant composition. The blend ratio preferably falls between 0.5 and 30% by weight.

The detergent dispersant may also be added to hydrocarbon oil serving as fuel oil. Its blend ratio preferably falls between 0.001 and 1% by weight.

The hydrocarbon oil may be any fraction, including, for example, fuel oil such as gasoline, kerosene, gas oil; and lubricant oil (e.g., paraffinic mineral oil, naphthenic mineral oil, aromatic mineral oil), and it may be purified in any method of solvent purification, hydrogenation purification or hydrogenation cracking. The synthetic oil includes, for example, polyphenyl ethers, alkylbenzenes, alkylnaphthalenes, ester oils, glycolic or polyolefinic synthetic oils. The lubricant oil fraction preferably has a kinematic viscosity at 100° C. falling between 1 and 50 mm$^2$/sec, more preferably between 3 and 20 mm$^2$/sec.

The mixtures prepared by adding the succinimide compound to lubricant oil fractions such as hydrocarbon oil, synthetic oil or their mixtures can be used for lubricant oil compositions for internal-combustion engines (e.g., lubricant oil compositions for diesel engines), gear oil, bearing oil, transmission oil, shock absorber oil and other industrial lubricant oils.

In the invention, any ordinary additives for lubricant oil, such as antioxidant, anti-wear additive, viscosity index improver and pour point depressant may be used, not interfering with the effect of the succinimide compounds of the invention.

The mixture prepared by adding the succinimide compound to hydrocarbon fuel oil serves as a detergent for preventing deposition of impurities in internal-combustion engine carburetors and for removing the deposits therein.

The succinimide compounds having a specific structure of the invention are represented by formula (I) mentioned above.

In formula (I), R$^1$ represents an alkyl or alkenyl group having a number-average molecular weight (Mn, hereinafter referred to as "molecular weight") of from 200 to 5,000, preferably from 500 to 2,000.

If the molecular weight of the alkyl or alkenyl group is smaller than 200, the succinimide compounds could not well dissolve in lubricant base oil; but if larger than 5,000, the succinimide compounds will be too viscous and will be difficult to handle.

For the alkyl or alkenyl group having the defined molecular weight, generally used are polymers or copolymers of monoolefins or diolefins having from 2 to 16 carbon atoms, or their hydrides. Examples of the monoolefins are ethylene, propylene, butene, butadiene, decene, dodecene, and hexadecene. Of those monoolefins, especially preferred for use herein is butene as effective for enhancing high-temperature detergency and as easily available. Therefore preferred for use herein are a polybutenyl group derived from its polymer, and a hydropolybutenyl group, a type of an alkyl group derived from the polymer hydride.

In the invention, X in formula (I) represents a monovalent residue derived from a polyalkylene-polyamine optionally having a cyclic structure, by removing one terminal amino group from the polyalkylene-polyamine, and the other terminal, or that is, the terminal of the compound of formula (I) is represented by formula (II) mentioned above. This means that the compound of formula (I) is terminated with a secondary or tertiary amine, and we, the present inventors have found that the succinimide compounds having such a specific chemical structure are effective for significantly enhancing the properties of detergents such as high-temperature detergency thereof.

The succinimide compounds terminated with a secondary or tertiary amine are also significantly effective even though they contain any other succinimides not having such a specific chemical structure. Preferably, in the invention, the secondary or tertiary amine-terminated succinimides account for at least 5% by weight, more preferably at least 10% by weight, even more preferably at least 30% by weight of all succinimide compounds.

X in formula (I) is described in more detail hereinunder.

The polyalkylene-polyamine optionally having a cyclic structure means that it may be any of linear or branched, or that is, acyclic polyalkylene-polyamines, cyclic polyalkylene-polyamines, and their mixtures.

Typical examples of the acyclic polyalkylene-polyamine are ethylenediamine, propylenediamine, diethylenetriamine, triethylenetetramine, tetraethylenepentamine, pentaethylenehexamine, dibutylenetriamine, and tributylenetriamine. Typical examples of the cyclic polyalkylene-polyamine are piperazinyl structure-having aminoalkylpiperazines and di(aminoalkyl)piperazines such as aminoethylpiperazine, aminopropylpiperazine, aminobutylpiperazine, amino(diethylenediamino)piperazine, amino(dipropyldiamino)piperazine.

Of those, especially preferred are triethylenetetramine, tetraethylenepentamine, pentaethylenehexamine, and aminoalkylpiperazines, as effective for enhancing high-temperature detergency and as easily available.

In addition to the above-mentioned requirement, X in formula (I) in the invention must satisfy another requirement that the other terminal structure is represented by formula (II).

In formula (II), R$^2$ and R$^3$ each independently represent a hydrogen atom or a hydrocarbon group, and they may be the same or different. However, both of them must not be hydrogen atoms at the same time. In other words, at least any one of R$^2$ and R$^3$ is a hydrocarbon group.

The hydrocarbon group is not specifically defined, but preferably has from 1 to 50, more preferably from 1 to 30 carbon atoms. The hydrocarbon group includes, for example, a linear or branched, saturated or unsaturated alkyl group, a cycloalkyl group, an aryl group, an alkyl-substituted aryl group, and an aryl-substituted alkyl group.

In preferred embodiments of the invention, the hydrocarbon group for R$^2$ or R$^3$ in formula (II) is an alkyl group, or a phenyl-substituted alkyl group with the phenyl group being optionally substituted with alkyl group(s), or a phenyl group optionally substituted with alkyl group(s). More preferably, it is a linear or branched alkyl group having from 1 to 16 carbon atoms, or a phenyl-substituted alkyl group with the phenyl group being optionally substituted with alkyl group(s) of formula (III), or a phenyl group optionally substituted with alkyl group(s) of formula (IV).

Examples of the linear or branched alkyl group having from 1 to 16 carbon atoms are a methyl group, an ethyl group, an n-propyl group, an isopropyl group, an n-butyl group, an isobutyl group, a sec-butyl group, all types of amyl groups, all types of hexyl groups, all types of octyl groups, a decyl group, a dodecyl group, and a hexadecyl group. Of those, especially preferred are alkyl groups having from 2 to 12 carbon atoms.

R$^4$ in formula (III) that represents a phenyl-substituted alkyl group with the phenyl group being optionally substituted with alkyl group(s) indicates a linear or branched alkylene group having from 1 to 16 carbon atoms; and R$^5$ therein indicates a linear or branched alkyl group having from 1 to 16 carbon atoms.

Examples of the linear or branched alkylene group having from 1 to 16 carbon atoms for R$^4$ are a methylene group, an ethylene group, an n-propylene group, an isopropylene group, an n-butylene group, an isobutylene group, a sec-butylene group, all types of amylene groups, all types of hexylene groups, all types of octylene groups, a decylene group, a dodecylene group, and a hexadecylene group. Of those, especially preferred are alkylene groups having from 2 to 12 carbon atoms.

For $R^5$ indicating a linear or branched alkyl group having from 1 to 16 carbon atoms for $R^5$, referred to are the examples of the linear or branched alkyl group having from 1 to 16 carbon atoms mentioned hereinabove.

In formula (III), a indicates an integer of from 0 to 3, but is preferably 1.

In formula (IV) representing a phenyl group optionally substituted with alkyl group(s), $R^6$ indicates a linear or branched alkyl group having from 1 to 16 carbon atoms, for which also referred to are the examples of the linear or branched alkyl group having from 1 to 16 carbon atoms mentioned hereinabove. In formula (IV), b indicates an integer of from 0 to 3, but is preferably 1.

Accordingly, preferred examples of X in formula (I) are monovalent residues derived from polyalkylene-polyamines mentioned below, by removing the terminal amino group from them.

The polyalkylene-polyamines are 1-alkylpolyalkylene-polyamines, including, for example, 1-ethylethylenediamine, 1-propylethylenediamine, 1-butylethylenediamine, 1-propyldiethylenetriamine, 1-propyltriethylenetetramine, 1-propyltetraethylenepentamine, 1-propylpentaethylenehexamine, 1-propyldibutylenetriamine, 1-propyltributylenetetramine, 1-butyldiethylenetriamine, 1-butyltriethylenetetramine, 1-butyltetraethylenepentamine, 1-butylpentaethylenehexamine, 1-butyldibutylenetriamine, 1-butyltributylenetetramine.

The second succinimide compounds having a specific structure of the invention are obtained through (C) alkylation of a reaction product of (A) a succinic acid or its anhydride substituted with an alkyl or alkenyl group having a molecular weight of from 200 to 5,000, and (B) a polyalkylene-polyamine optionally having a cyclic structure.

For these, the starting material (A), a succinic acid or its anhydride substituted with an alkyl or alkenyl group having a molecular weight of from 200 to 5,000 may be prepared by introducing the specific alkyl or alkenyl group into a succinic acid or its anhydride.

The alkyl or alkenyl group may be the same as that indicated $R^1$ in formula (I) mentioned above. Accordingly, preferred examples of the group are a polybutenyl group having a molecular weight of from 200 to 5,000, preferably from 500 to 2,000, and a hydropolybutenyl group, a type of an alkyl group derived from the polybutenyl group through hydrogenation.

The starting material (B), a polyalkylene-polyamine optionally having a cyclic structure includes acyclic polyalkylene-polyamines, cyclic polyalkylene-polyamines, and their mixtures. For these, referred to are the examples of the polyalkylene-polyamine optionally having a cyclic structure mentioned hereinabove for X in formula (I). Needless-to-say, however, the limitation on X in formula (I) indicating that its terminal is a specific hydrocarbon should not apply to the polyalkylene-polyamines for the starting material (B).

In the invention, the reaction products of (A) and (B) is alkylated to give the succinimide compounds. (A) and (B) maybe reacted in any known manner. For example, the blend ratio of the materials (A) and (B) to be reacted is preferably such that (A):(B) falls between 0.1:1 and 10:1 by mol, more preferably between 0.5:1 and 2:1 by mol.

The temperature for the reaction of (A) and (B) preferably falls between 80° C. and 250° C., more preferably between 100° C. and 200° C. In the reaction, optionally used is a solvent, for example, an organic solvent such as hydrocarbon oil for handling the materials with ease and for controlling the reaction.

In the invention, the reaction product of (A) and (B) obtained in the manner as above is further alkylated (C) to give the succinimide compounds.

The alkylation is not specifically defined, for which, for example, preferred are (C-1) a method of using the compound of formula (V) mentioned above for the alkylating agent; and (C-2) a method of using the compound of formula (VIII) mentioned above for the alkylating agent, in which the alkylation is followed by hydrogenation.

In the alkylation method (C-1), used is the alkylating agent of formula (V) in which $R^7$ indicates a hydrocarbon group. Preferably, the hydrocarbon group has from 1 to 50 carbon atoms, more preferably from 1 to 30 carbon atoms. For this, referred to is the hydrocarbon group of $R^2$ and $R^3$ of formula (II) that constitutes the terminal structure of formula (I). Accordingly, preferred examples of the hydrocarbon group for $R^7$ are an alkyl group, a phenyl-substituted alkyl group with the phenyl group being optionally substituted with alkyl group(s), and a phenyl group optionally substituted with alkyl group(s). More preferred for the hydrocarbon group for $R^7$ are a linear or branched alkyl group having from 1 to 16 carbon atoms, a phenyl-substituted alkyl group with the phenyl group being optionally substituted with alkyl group(s) of formula (VI), and a phenyl group optionally substituted with alkyl group(s) of formula (VII). In formula (VI), $R^8$, $R^9$ and c have the same meanings as $R^4$, $R^5$ and a, respectively, in formula (III). In formula (VII), $R^{10}$ and d have the same meanings as $R^6$ and b in formula (IV).

Y in formula (V) represents a halogen atom or a sulfonic acid group. Concretely, the halogen atom includes fluorine, chlorine, bromine and iodine atoms; and the sulfonic acid group includes a toluenesulfonic acid group and a methanesulfonic acid group. The alkylation of the reaction product of (A) and (B) with the alkylating agent mentioned above may be effected under any ordinary condition. For example, in the method (C-1), the blend ratio of the alkylating agent based on the material (B) in the reaction products (A) and (B) is preferably such that (B):(alkylating agent in C-1) falls between 1:0.1 and 1:10 by mol, more preferably between 1:0.5 and 1:5 by mol.

The reaction temperature preferably falls between 0° C. and 200° C., more preferably between 0° C. and 150° C. Like in the reaction of (A) and (B), a solvent may be optionally used in the alkylation.

Next described is the alkylation method (C-2) of the reaction product of (A) and (B).

The alkylating agent for the alkylation (C-2) is, for example, represented by formula (VIII). For the hydrocarbon group for $R^{11}$, referred to is that for $R^7$ in formula (V) mentioned hereinabove. Accordingly, especially preferred examples of the hydrocarbon group for $R^7$ are a linear or branched alkyl group having from 1 to 16 carbon atoms, a phenyl-substituted alkyl group with the phenyl group being optionally substituted with alkyl group(s) of formula (IX), and a phenyl group optionally substituted with alkyl group(s) of formula (X). In formula (IX), $R^{12}$, $R^{13}$ and e have the same meanings as $R^4$, $R^5$ and a, respectively, in formula (III). In formula (X), $R^{14}$ and f have the same meanings as $R^6$ and b in formula (IV).

For the reaction condition of the alkylation of the reaction product of (A) and (B) with the alkylating agent of formula (VII) in (C-2), referred to is the same as in (C-1) mentioned hereinabove.

In the alkylation (C-2), the reaction product (A) and (B) alkylated with the alkylating agent is then hydrogenated. The condition for the hydrogenation is not specifically defined. For example, the alkylated product may be hydrogenated with hydrogen being applied thereto or in a hydrogen atmosphere, in the presence of a hydrogenation catalyst.

For the hydrogenation catalyst, generally used is a metallic component held on a carrier. Concretely, the catalyst comprises a metallic component, for example, an element of Groups 8 to 10 of the Periodic Table such as nickel, ruthenium, palladium, platinum, rhodium or iridium, held on an inorganic oxide carrier such as diatomaceous earth, alumina, silica, alumina or activated carbon. Above all, preferred are nickel, palladium and platinum catalysts in view of their selectivity. Concretely, they include nickel/diatomaceous earth, nickel/silica-alumina, Raney nickel, palladium/carbon, palladium/silica-alumina, and platinum oxide.

The reaction temperature for the hydrogenation is not specifically defined, but preferably falls between 0° C. and 200° C., more preferably between 50° C. and 150° C. If the hydrogenation temperature is lower than 0° C., the hydrogenation speed is low and is therefore uneconomical; but if higher than 200° C., the product will decompose and its yield will lower.

The reaction pressure for the hydrogenation is not also specifically defined, but preferably falls between 0 and 30 MPa (G), more preferably between 0.1 and 10 MPa (G).

The third succinimide compounds having a specific structure of the invention are obtained through reaction of (A) a succinic acid or its anhydride substituted with an alkyl or alkenyl group having a molecular weight of from 200 to 5,000, with (D) a hydrocarbon-substituted polyalkylene-polyamine.

For the starting material (A) for these, referred to are the same for the material (A) mentioned hereinabove.

For the starting material (D), generally used are hydrocarbon-substituted polyalkylene-polyamines of formula (XI) mentioned above.

In formula (XI), X indicates a monovalent residue derived from a polyalkylene-polyamine optionally having a cyclic structure, by removing one terminal amino group from the polyalkylene-polyamine, and the other terminal is a group of the following general formula (XII). The group for X in formula (XI) maybe the same as that for X in formula (I). Specifically, in formula (XII), $R^{15}$ and $R^{16}$ have the same meanings as $R^2$ and $R^3$, respectively, in formula (II). Accordingly, especially preferred examples of the hydrocarbon group for $R^{15}$ and $R^{16}$ in formula (XII) are a linear or branched alkyl group having from 1 to 16 carbon atoms, a phenyl-substituted alkyl group with the phenyl group being optionally substituted with alkyl group(s) of formula (XIII), and a phenyl group optionally substituted with alkyl group(s) of formula (XIV). In formula (XIII), $R^{17}$, $R^{18}$ and g have the same meanings as $R^4$, $R^5$ and a, respectively, in formula (III). In formula (XIV), $R^{19}$ and h have the same meanings as $R^6$ and b in formula (IV).

Preferred examples of the hydrocarbon-substituted polyalkylene-polyamine (D) are 1-alkylpolyalkylene-polyamines polyamines such as 1-ethylethylenediamine, 1-propylethylenediamine, 1-butylethylenediamine, 1-propyldiethylenetriamine, 1-propyltriethylenetetramine, 1-propyltetraethylenepentamine, 1-propylpentaethylenehexamine, 1-propyldibutylenetriamine, 1-propyltributylenetetramine, 1-butyldiethylenetriamine, 1-butyltriethylenetetramine, 1butyltetraethylenepentamine, 1-butylpentaethylenehexamine, 1-butyldibutylenetriamine, 1-butyltributylenetetramine.

One or more of these may be used herein.

The reaction of (A) and (D) in the invention is not specifically defined, and may be effected in any ordinary manner. Regarding the blend ratio of the reactants, (A):(D) preferably falls between 1:1 and 10:1 by mol, more preferably between 1:1 and 2:1 by mol.

The temperature for the reaction of (A) and (D) preferably falls between 80° C. and 250° C., more preferably between 100° C. and 200° C. Like in the other cases mentioned hereinabove, a solvent may also be used in this reaction.

The fourth succinimide compounds having a specific structure of the invention are obtained through <1> hydrogenation and/or <2> contact treatment with an adsorbent of the succinimide compounds mentioned hereinabove.

In the invention, the hydrocarbon-substituted succinimides mentioned above may be subjected to the hydrogenation <1> alone, or may be subjected to the adsorbent contact treatment <2> alone. In case where they are subjected to both <1> and <2>, the order of the treatments is not defined. Thus processed, the succinimide compounds are further improved to have better high-temperature detergency.

The hydrogenation <1> is effected generally in the presence of a hydrogenation catalyst.

The hydrogenation catalyst may comprise a metallic component held on a carrier. For its examples, referred to are those mentioned hereinabove for the hydrogenation catalyst in the method (C-2) comprising alkylation followed by hydrogenation.

The hydrogenation temperature is not specifically defined, but preferably falls between 0° C. and 200° C., more preferably between 20° C. and 150° C. If the hydrogenation temperature is lower than 0° C., the hydrogenation speed is low and is therefore uneconomical; but if higher than 200° C., the product will decompose and its yield will lower.

The reaction pressure for the hydrogenation is not also specifically defined, but preferably falls between 0 and 30 MPa (G), more preferably between 0.1 and 10 MPa (G).

The hydrogenation time generally falls between 30 minutes and 5 hours or so

In the other method <2> of contact with an adsorbent, the succinimide compounds or their compositions are efficiently contacted with an adsorbent.

The adsorbent includes, for example, activated carbon, other carbons, graphite, diatomaceous earth, clay, zeolite, hydrotalcite, silica and alumina. Of those, preferred for use herein are activated carbon, diatomaceous earth, clay, silica and alumina, as their adsorption efficiency is high. Two or more such adsorbents may be used herein.

In the contact treatment, the succinimide compounds may be optionally diluted with a solvent for handling the compounds with ease and for increasing the contact efficiency.

The solvent for dilution is not specifically defined. For example, employable are organic solvents such as petroleum hydrocarbons, hexane, heptane, cyclohexane, toluene and xylene.

The temperature for the contact treatment preferably falls between 0° C. and 200° C., more preferably between 20° C. and 150° C.

For the adsorbent contact treatment, concretely, from 0.1 to 10% by weight of the adsorbent is added to the succinimide compounds or their dilutions in solvent, and stirred at a predetermined temperature.

The fifth succinimide compounds having a specific structure of the invention are obtained through reaction of the succinimides mentioned above with (E) a boron compound.

The boron content of the reaction products, succinimide compounds preferably falls between 0.05 and 5% by weight, more preferably between 0.1 and 4% by weight in terms of the boron atom.

The boron compound (E) includes, for example, boric acid, boric anhydride, borates, boron oxide, and boron halides.

The blend ratio of the boron compound in the reaction is preferably such that the molar ratio of the boron compound to the polyalkylene-polyamine falls between 1:0.05 and 1:10, more preferably between 1:0.5 and 1:5.

The reaction temperature preferably falls between 50° C. and 250° C., more preferably between 100° C. and 200° C.

In the reaction, optionally used is a solvent, for example, an organic solvent such as hydrocarbon oil, for handling the succinimides with ease and for controlling the reaction.

In the description given above, the succinimides are reacted with a boron compound after they are subjected to <1> hydrogenation and/or <2> adsorbent contact treatment. In the invention, however, they may be first reacted with a boron compound, and then subjected to <1> hydrogenation and/or <2> adsorbent contact treatment.

The succinimide compounds of the invention are effectively used for detergent dispersants. The detergent dispersant containing the compound may be mixed with lubricant base oil such as hydrocarbon oil or synthetic oil, to an amount of from 0.1 to 80% by weight to prepare a lubricant oil composition. The blend ratio of the detergent dispersant preferably falls between 0.5 and 30% by weight.

The detergent dispersant may also be added to hydrocarbon oil for fuel oil. Its blend ratio preferably falls between 0.001 and 1% by weight.

The hydrocarbon oil may be any fraction, including, for example, fuel oil such as gasoline, kerosene, gas oil; and lubricant oil (e.g., paraffinic mineral oil, naphthenic mineral oil, aromatic mineral oil), and it may be purified in any method of solvent purification, hydrogenation purification or hydrogenation cracking. The synthetic oil includes, for example, polyphenyl ethers, alkylbenzenes, alkylnaphthalenes, ester oils, glycolic or polyolefinic synthetic oils. The lubricant oil fraction preferably has a kinematic viscosity at 100° C. falling between 1 and 50 mm$^2$/sec, more preferably between 3 and 20 mm$^2$/sec.

The mixtures prepared by adding the succinimide compound to lubricant oil fractions such as hydrocarbon oil, synthetic oil or their mixtures can be used for lubricant oil compositions for internal-combustion engines (e.g., lubricant oil compositions for diesel engines), gear oil, bearing oil, transmission oil, shock absorber oil and other industrial lubricant oils.

In the invention, any ordinary additives for lubricant oil, such as antioxidant, anti-wear additive, viscosity index improver and pour point depressant maybe used, not interfering with the effect of the succinimide compounds of the invention.

The mixture prepared by adding the succinimide compound to hydrocarbon fuel oil serves as a detergent for preventing deposition of impurities in internal-combustion engine carburetors and for removing the deposits therein.

The invention is described more concretely with reference to the following Examples, which, however, are not intended to restrict the scope of the invention.

EXAMPLE 1

550 g of polybutene (Mn: 980), 1.5 g (0.005 mol) of cetyl bromide, and 59 g (0.6 mol) of maleic anhydride were put into a one-liter autoclave, purged with nitrogen, and reacted at 240° C. for 5 hours. This was cooled to 215° C., and the non-reacted maleic anhydride and cetyl bromide were removed through distillation under reduced pressure. This was further cooled to 140° C., and then filtered. The yield of the resulting polybutenylsuccinic anhydride was 550 g, and the saponification value thereof was 86 mg KOH/g. 500 g of the polybutenylsuccinic anhydride was put into a one-liter separable flask along with 22 g (0.17 mol) of aminoethylpiperazine (AEP), 18 g (0.17 mol) of diethylenetriamine (EDTA) and 250 g of 150-neutral fraction mineral oil thereinto, and reacted in a nitrogen stream atmosphere at 150° C. for 2 hours. This was heated up to 200° C., and the non-reacted AEP and EDTA and the water formed were removed through distillation under reduced pressure. The yield of the resulting polybutenylsuccinimide was 750 g, and the base value (measured according to a perchloric acid method) was 51 mg KOH/g. 150 g of the polybutenylsuccinimide and 20 g of boric acid were put into a 500-ml separable flask, and reacted in a nitrogen stream atmosphere at 150° C. for 4 hours. The water formed was removed through distillation under reduced pressure at 150° C., and this was cooled to 140° C. and filtered. The yield of the product was 165 g, and the boron content thereof was 2.1% by weight.

EXAMPLE 2

The same process as in Example 1 was repeated. In this, however, used were 22 g (0.17 mol) of aminoethylpiperazine (AEP) and 25 g (0.17 mol) of triethylenetetramine (TETA) in place of 22 g (0.17 mol) of aminoethylpiperazine (AEP) and 18 g (0.17 mol) of diethylenetriamine (DETA). The yield of the product obtained herein was 165 g, and the boron content thereof was 2.1% by weight.

EXAMPLE 3

The same process as in Example 1 was repeated. In this, however, used were 31 g (0.24 mol) of aminoethylpiperazine (AEP) and 10 g (0.10 mol) of diethylenetriamine (DETA) in place of 22 g (0.17 mol) of aminoethylpiperazine (AEP) and 18 g (0.17 mol) of diethylenetriamine (DETA). The yield of the product obtained herein was 160 g, and the boron content thereof was 2.1% by weight.

EXAMPLE 4

The same process as in Example 1 was repeated. In this, however, used were 5 g (0.04 mol) of aminoethylpiperazine (AEP) and 31 g (0.30 mol) of diethylenetriamine (DETA) in place of 22 g (0.17 mol) of aminoethylpiperazine (AEP) and 18 g (0.17 mol) of diethylenetriamine (DETA). The yield of the product obtained herein was 165 g, and the boron content thereof was 2.2% by weight.

EXAMPLE 5

The same process as in Example 1 was repeated. In this, however, used were 14 g (0.11 mol) of aminoethylpiperazine (AEP), 11.5 g (0.11 mol) of diethylenetriamine (DETA) and 16 g (0.11 mol) of triethylenetetramine (TETA) in place of 22 g (0.17 mol) of aminoethylpiperazine (AEP) and 18 g (0.17 mol) of diethylenetriamine (DETA). The yield of the product obtained herein was 165 g, and the boron content thereof was 2.1% by weight.

EXAMPLE 6

The same process as in Example 1 was repeated. In this, however, used was 44 g (0.34 mol) of aminoethylpiperazine (AEP) in place of 22 g (0.17 mol) of aminoethylpiperazine (AEP) and 18 g (0.17 mol) of diethylenetriamine (DETA). The yield of the product obtained herein was 155 g, and the boron content thereof was 2.0% by weight. Different from the products in Examples 1 to 5, the product obtained herein was highly viscous and was difficult to handle.

COMPARATIVE EXAMPLE 1

The same process as in Example 1 was repeated. In this, however, used was 50 g (0.34 mol) of triethylenetetramine (TETA) only, in place of 22 g (0.17 mol) of aminoethylpiperazine (AEP) and 18 g (0.17 mol) of diethylenetriamine (DETA). The yield of the product obtained herein was 165 g, and the boron content thereof was 2.0% by weight.

COMPARATIVE EXAMPLE 2

Herein used was the polybutenylsuccinimide of Comparative Example 1 not as yet subjected to boronation.

COMPARATIVE EXAMPLE 3

Herein used was the polybutenylsuccinimide of Example 1 not as yet subjected to boronation.

EXAMPLES 7 TO 12, AND COMPARATIVE EXAMPLES 4 to 6

10% by weight of the succinimide compound obtained in any of Examples 1 to 6 and Comparative Examples 1 to 3 was added to 500-neutral fraction mineral oil to prepare lubricant oil compositions.

The lubricant oil compositions were tested to evaluate their properties, according to a hot tube test method mentioned below. The results are given in Table 1.

EXAMPLES 13 TO 18

7.5% by weight of the imide obtained in any of Examples 1 to 5, and 2.5% by weight of dodecylphenyl dodecylsalicylate were added to 500-neutral fraction mineral oil to prepare lubricant oil compositions. The lubricant oil compositions were tested to evaluate their properties, according to the hot tube test method. The results are given in Table 1.

[Hot Tube Test Condition]

0.3 ml/hr of a sample oil to be tested was kept led into a glass tube having an inner diameter of 2 mm for 16 hours, along with 10 ml/min of air thereinto, while the temperature in the glass tube was kept at 270° C. during the process. The lacquer deposited on the inner wall of the glass tube was compared with a color index. The transparent tube is 10 points; and the black tube is 0 point. The weight of the lacquer was measured. The higher point and the lower lacquer weight mean better samples.

TABLE 1

| | Type of Imide Compound | Hot Tube Test (270° C.) | |
|---|---|---|---|
| | | Point | Deposit (mg) |
| Example 7 | Example 1 | 8 | 1 or less |
| Example 8 | Example 2 | 8 | 1 or less |
| Example 9 | Example 3 | 8 | 1 or less |
| Example 10 | Example 4 | 7 | 1 or less |
| Example 11 | Example 5 | 8 | 1 or less |
| Example 12 | Example 6 | 8 | 1 or less |
| Example 13 | Example 1 | 10 | 1 or less |
| Example 14 | Example 2 | 10 | 1 or less |
| Example 15 | Example 3 | 10 | 1 or less |
| Example 16 | Example 4 | 10 | 1 or less |
| Example 17 | Example 5 | 10 | 1 or less |
| Example 18 | Example 6 | 10 | 1 or less |
| Comp. Example 4 | Comp. Example 1 | 2 | 3 |
| Comp. Example 5 | Comp. Example 2 | 0 | 32 |
| Comp. Example 6 | Comp. Example 3 | 0 | 24 |

When the data of Examples 7 to 12 are compared with those of Comparative Examples 1 to 3 in Table 1, the unexpected effect of the invention is obvious in that the lubricant oil compositions containing the borosuccinimide compound of the invention all gained much higher points and gave much less deposit in the hot tube test at 270° C. than those containing the conventional succinimide compound.

When the data of Examples 13 to 18 are compared with those of Examples 7 to 12 in Table 1, it is understood that the lubricant oil compositions containing a mixture of the borosuccinimide compound and dodecylphenyl dodecylsalicylate gained much higher points and are therefore more effective than those containing the borosuccinimide compound only.

PRODUCTION EXAMPLE 1

1100 g of polybutene (Mw: 987), 6.4 g (0.021 mol) of cetyl bromide and 115 g (1.2 mols) of maleic anhydride were put into a 2-liter autoclave, purged with nitrogen, and reacted at 240° C. for 5 hours. This was cooled to 215° C., and the non-reacted maleic anhydride and cetyl bromide were removed through distillation under reduced pressure. This was further cooled to 140° C., and then filtered. The yield of the resulting polybutenylsuccinic anhydride was 1100 g, and the saponification value thereof was 80 mg KOH/g. 500 g of the polybutenylsuccinic anhydride was put into a 2-liter separable flask along with 64 g (0.34 mol) of tetraethylenepentamine (TEPA) and 300 g of 150-neutral fraction mineral oil thereinto, and reacted in a nitrogen stream atmosphere at 150° C. for 2 hours. This was heated up to 200° C., and the non-reacted TEPA and the water formed were removed through distillation under reduced pressure. This was cooled to 140° C. and filtered. The yield of the resulting polybutenylsuccinimide was 790 g, the base value thereof was 77 mg KOH/g, and the kinematic viscosity (100° C.) thereof was 149 mm$^2$/sec.

PRODUCTION EXAMPLE 2

The same process as in Production Example 1 was repeated. In this, however, used was 915 g of polybutene (Mw: 800) in place of polybutene (Mw: 987). The yield of the resulting polybutenylsuccinic anhydride was 940 g, and the saponification value thereof 95 mg KOH/g. Next, also in the same manner as in Production Example 1, 500 g of the polybutenylsuccinic anhydride was reacted with 76 g (0.40 mol) of tetraethylenepentamine (TEPA) in 300 g of 150-neutral fraction mineral oil. The yield of the resulting polybutenylsuccinimide was 810 g, the base value thereof was 85 mg KOH/g, and the kinematic viscosity (100° C.) thereof was 109 mm$^2$/sec.

PRODUCTION EXAMPLE 3

The same process as in Production Example 1 was repeated. In this, however, used were 890 g of polybutene (Mw: 445) in place of polybutene (Mw: 987), and 11 g (0.036 mol) of cetyl bromide and 397 g (2.1 mols) of maleic anhydride. The yield of the resulting polybutenylsuccinic anhydride was 990 g, and the saponification value thereof 142 mg KOH/g. Next, also in the same manner as in Production Example 1, 500 g of the polybutenylsuccinic anhydride was reacted with 88 g (0.60 mol) of triethylene-tetramine (TETA) in 300 g of 150-neutral fraction mineral oil. The yield of the resulting polybutenylsuccinimide was 820 g, the base value thereof was 98 mg KOH/g, and the kinematic viscosity (100° C.) thereof was 130 mm$^2$/sec.

EXAMPLE 19

100 g of the polybutenylsuccinimide prepared in Production Example 1 was put into a 300-ml autoclave along with 4.3 g (0.06 mol) of n-butylaldehyde, 100 ml of n-hexane and 1 g of 5% palladium-carbon, and the autoclave was purged with hydrogen gas. The hydrogen pressure was kept at 1 MPa (G), and these were reacted at room temperature for 2 hours with stirring, then heated up to 100° C., and further reacted for 6 hours. After cooled, the reaction product was taken out, and filtered. N-hexane was evaporated away, and the yield of the product was 101 g.

EXAMPLE 20

The polybutenylsuccinimide was reacted in the same manner as in Example 19, for which, however, used was 6.4 g (0.06 mol) of benzaldehyde in place of n-butylaldehyde. The yield of the product obtained herein was 102 g.

EXAMPLE 21

100 g of the polybutenylsuccinimide prepared in Production Example 2, and not the polybutenylsuccinimide prepared in Production Example 1, was reacted with 5.0 g (0.07 mol) of n-butylaldehyde in the same manner as in Example 19. The yield of the product was 102 g.

EXAMPLE 22

100 g of the polybutenylsuccinimide prepared in Production Example 3, and not the polybutenylsuccinimide prepared in Production Example 1, was reacted with 8.6 g (0.12 mol) of n-butylaldehyde in the same manner as in Example 19. The yield of the product was 104 g.

EXAMPLE 23

20 g (0.14 mol) of triethylenetetramine (TETA), 10 g (0.14 mol) of n-butylaldehyde and 0.7 g of 5% palladium-carbon were put into a 300-ml autoclave, and purged with hydrogen gas. The hydrogen pressure was kept at 1 MPa (G), and these were heated up to 100° C. and reacted for 6 hours. After cooled, the reaction product was taken out, and filtered. The yield of the product was 28 g. 22 g (0.11 mol) of the product was put into a 500-ml separable flask along with 175 g of the intermediate in Production Example 1, polybutenylsuccinic anhydride and 105 g of 150-neutral fraction mineral oil thereinto, and these were reacted in a nitrogen stream atmosphere at 150° C. for 2 hours. This was heated up to 200° C., and the non-reacted matter and the water formed were removed through distillation under reduced pressure. This was cooled to 140° C. and filtered. The yield of the resulting polybutenylsuccinimide was 270 g, the base value thereof was 61 mg KOH/g, and the kinematic viscosity (100° C.) thereof was 140 mm$^2$/sec.

EXAMPLES 24 TO 28

60 g of the polybutenylsuccinimide obtained in any of Examples 19 to 23, and 8 g of boric acid were put into a 200-ml separable flask, and reacted in a nitrogen stream atmosphere at 150° C. for 4 hours. The water formed was removed through distillation under reduced pressure at 150° C. This was cooled to 140° C. and filtered. The properties of the products are shown in Table 2.

EXAMPLES 29 TO 33

10% by weight of the polybutenylsuccinimide compound obtained in any of Examples 19 to 23 was added to 500-neutral fraction mineral oil to prepare lubricant oil compositions.

The lubricant oil compositions were tested to evaluate their properties, according to the hot tube test method. The results are given in Table 3.

EXAMPLES 34 TO 38

10% by weight of the polybutenylsuccinimide compound obtained in any of Examples 24 to 28 was added to 500-neutral fraction mineral oil to prepare lubricant oil compositions.

The lubricant oil compositions were tested to evaluate their properties, according to the hot tube test method. The results are given in Table 4.

COMPARATIVE EXAMPLES 7 TO 9

60 g of the polybutenylsuccinimide obtained in any of Production Examples 1 to 3, and 8 g of boric acid were put into a 200-ml separable flask, and reacted in a nitrogen stream atmosphere at 150° C. for 4 hours. The water formed was removed through distillation under reduced pressure at 150° C. This was cooled to 140° C. and filtered. The properties of the products in Table 2.

COMPARATIVE EXAMPLES 10 to 12

10% by weight of the polybutenylsuccinimide obtained in any of Production Examples 1 to 3 was added to 500-neutral fraction mineral oil to prepare lubricant oil compositions.

The lubricant oil compositions were tested to evaluate their properties, according to the hot tube test method. The results are given in Table 3.

COMPARATIVE EXAMPLES 13 to 15

10% by weight of the polybutenylsuccinimide obtained in any of Comparative Examples 7 to 9 was added to 500-neutral fraction mineral oil to prepare lubricant oil compositions.

The lubricant oil compositions were tested to evaluate their properties, according to the hot tube test method. The results are given in Table 4.

TABLE 2

|  | Base Value (mm KOH/g) | Kinematic Viscosity at 100° C. (mm$^2$/sec) | Boron Content (wt. %) |
| --- | --- | --- | --- |
| Production Example 1 | 77 | 149 | — |
| Production Example 2 | 85 | 109 | — |
| Production Example 3 | 98 | 130 | — |
| Example 19 | 74 | 141 | — |
| Example 20 | 71 | 146 | — |
| Example 21 | 80 | 104 | — |
| Example 22 | 90 | 128 | — |
| Example 23 | 61 | 140 | — |
| Example 24 | 68 | — | 2.2 |
| Example 25 | 65 | — | 2.2 |
| Example 26 | 73 | — | 2.1 |
| Example 27 | 84 | — | 2.0 |

TABLE 2-continued

| | Base Value (mm KOH/g) | Kinematic Viscosity at 100° C. (mm²/sec) | Boron Content (wt. %) |
|---|---|---|---|
| Example 28 | 57 | — | 1.8 |
| Comparative Example 7 | 71 | — | 2.0 |
| Comparative Example 8 | 78 | — | 2.0 |
| Comparative Example 9 | 90 | — | 1.9 |

TABLE 3

| | Type of Imide Compound | Hot Tube Test (270° C.) | |
|---|---|---|---|
| | | Point | Deposit (mg) |
| Example 29 | Example 19 | 7 | 1 or less |
| Example 30 | Example 20 | 7 | 1 or less |
| Example 31 | Example 21 | 6 | 1 or less |
| Example 32 | Example 22 | 6 | 1 or less |
| Example 33 | Example 23 | 6 | 1 or less |
| Comp. Example 10 | Prodn. Example 1 | 1 | 15 |
| Comp. Example 11 | Prodn. Example 2 | 1 | 16 |
| Comp. Example 12 | Prodn. Example 3 | 1 | 19 |

TABLE 4

| | Type of Imide Compound | Hot Tube Test (270° C.) | |
|---|---|---|---|
| | | Point | Deposit (mg) |
| Example 34 | Example 24 | 10 | 1 or less |
| Example 35 | Example 25 | 10 | 1 or less |
| Example 36 | Example 26 | 9 | 1 or less |
| Example 37 | Example 27 | 9 | 1 or less |
| Example 38 | Example 28 | 8 | 1 or less |
| Comp. Example 13 | Comp. Example 7 | 2 | 5 |
| Comp. Example 14 | Comp. Example 8 | 1 | 5 |
| Comp. Example 15 | Comp. Example 9 | 1 | 9 |

When the data of Examples 29 to 33 are compared with those of Comparative Examples 10 to 12 in Table 3, it is understood that the lubricant oil compositions containing the succinimide compound of the invention all gained much higher points and gave much less deposit in the hot tube test than the conventional compositions.

When the data of Examples 34 to 38 are compared with those of Comparative Examples 13 to 15 in Table 4, the same as above shall apply also to the lubricant oil compositions containing the succinimide compound reacted with a boron compound, and it is understood that the borosuccinimide compounds are extremely effective.

INDUSTRIAL APPLICABILITY

The succinimide compounds and their mixtures with substituted hydroxy-aromatic carboxylate derivatives of the invention are extremely stable even at high temperatures, and their high-temperature detergency is extremely good. Accordingly, they are favorable for additives to lubricants and to fuel oil, and the lubricants and the fuel oil compositions containing them are extremely good.

What is claimed is:

1. A borosuccinimide compound obtained through reaction of (a) a succinic acid or its anhydride substituted with an alkyl or alkenyl group having a number-average molecular weight of from 200 to 5,000, (b) a polyalkylene-polyamine of which at least 5 mol % has a terminal cyclic structure represented by the following structural formula (1):

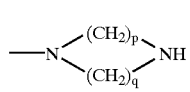

(1)

wherein p and q each indicates an integer of from 2 to 4, and (c) a boron compound.

2. The borosuccinimide compound as claimed in claim 1, for which the cyclic structure-terminated polyalkylene-polyamine accounts for from 5 to 95 mol % of all the polyalkylene-polyamine.

3. The borosuccinimide compound as claimed in claim 1, for which the cyclic structure-terminated polyalkylene-polyamine accounts for from 10 to 90 mol % of all the polyalkylene-polyamine.

4. The borosuccinimide compound as claimed in claim 1, for which the cyclic structure-terminated polyalkylene-polyamine is an aminoalkylpiperazine.

5. The borosuccinimide compound as claimed in claim 1, which has a boron content of from 0.05 to 5% by weight.

6. A borosuccinimide composition comprising reacted units of (a) succinic acid substituted with an alkyl or alkenyl group having a number-average molecular weight of from 200 to 5,000, or an anhydride thereof, (b) a polyalkylene-polyamine of which at least 5 mol % has a terminal cyclic structure represented by structural formula (1):

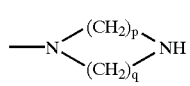

(1)

wherein p and q each indicate an integer of from 2 to 4, and (c) a boron compound.

7. The borosuccinimide composition as claimed in claim 6, for which the cyclic structure-terminated polyalkylene-polyamine accounts for from 5 to 95 mol % of all the polyalkylene-polyamine.

8. The borosuccinimide composition as claimed in claim 6, for which the cyclic structure-terminated polyalkylene-polyamine accounts for from 10 to 90 mol % of all the polyalkylene-polyamine.

9. The succinimide composition as claimed in claim 6, for which the cyclic structure-terminated polyalkylene-polyamine is an aminoalkylpiperazine.

10. The borosuccinimide composition as claimed in claim 6, which has a boron content of from 0.05 to 5% by weight.

11. The borosuccinimide composition as claimed in claim 1, wherein the boron compound is at least one selected from the group consisting of boric acid, boric anhydride, a borate, boron oxide and a boron halide.

12. The borosuccinimide composition as claimed in claim 6, wherein the boron compound is at least one selected from the group consisting of boric acid, boric anhydride, a borate, boron oxide and a boron halide.

13. The borosuccinimide composition as claimed in claim 1, wherein the boron compound is boric acid.

14. The borosuccinimide composition as claimed in claim 6, wherein the boron compound is boric acid.

* * * * *